(No Model.)

P. W. A. BECKER.
PLANTER.

No. 370,036. Patented Sept. 20, 1887.

Witnesses.
A. Ruppert.
W. V. Burris

Inventor.
P. W. A. Becker,
Per
Thomas D. Simpson,
atty.

UNITED STATES PATENT OFFICE.

PHILIPP WILLIAM ADOLPH BECKER, OF ANDERSON, TEXAS.

PLANTER.

SPECIFICATION forming part of Letters Patent No. 370,036, dated September 20, 1887.

Application filed April 29, 1887. Serial No. 236,596. (No model.)

*To all whom it may concern:*

Be it known that I, PHILIPP WILLIAM ADOLPH BECKER, a citizen of the United States, residing at Anderson, in the county of Grimes and State of Texas, have invented certain new and useful Improvements in Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a planter which may be easily, quickly, and conveniently adapted to plant cotton and corn with the fewest possible changes of parts.

Figure 1:
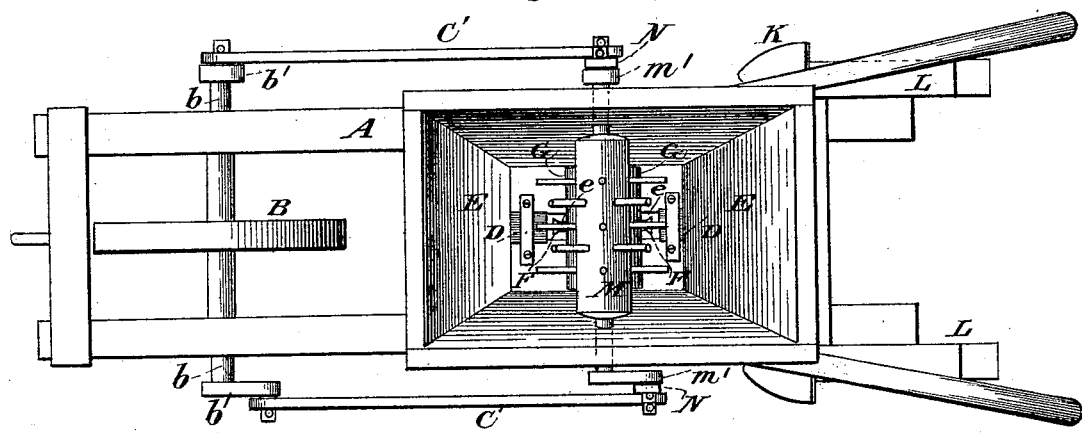
Figure 2:
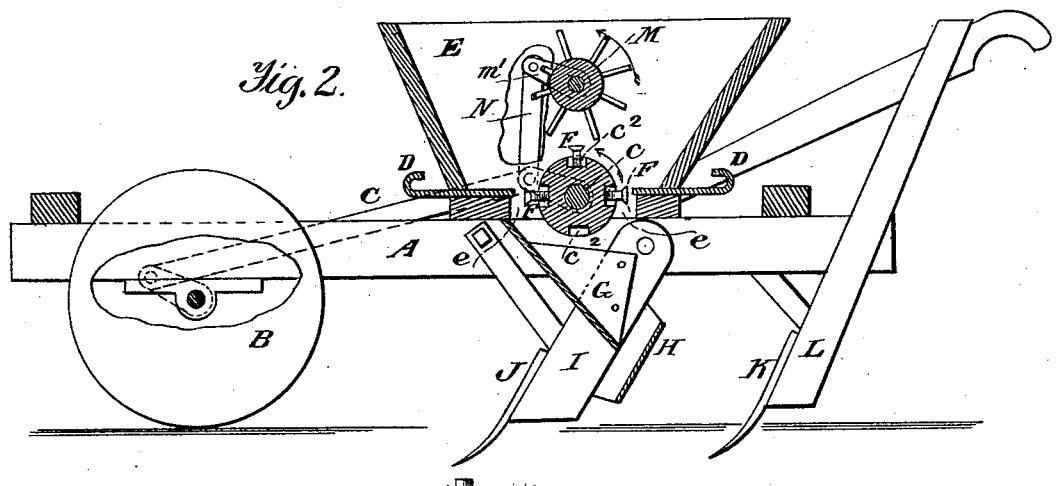
Figure 3:
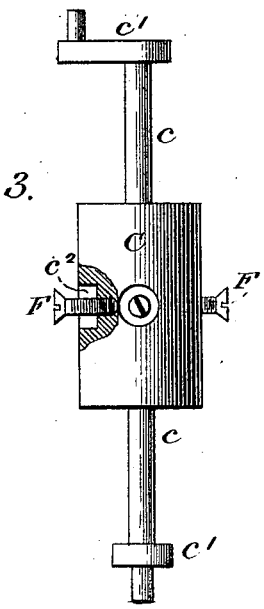

Figure 1 of the drawings is a plan view; Fig. 2, a vertical section, and Fig. 3 a detail view of the dropping-cylinder.

In the drawings, A represents the frame, under which is journaled a front ground-wheel, B, whose journals $b$ $b$ extend out on each side of the frame and carry cranks $b'$ $b'$. The latter are connected by wrist-pins and rod $C'$ with the cranks $c'$ $c'$ on the shaft $c$ of the dropping-cylinder C. This cylinder has cups $c^2$ in its periphery at regular intervals, so as to drop a given quantity of seed in each hill.

D D are slides which close up holes $e$ $e$ in the bottom of the seed-hopper E.

When it is desired to plant cotton, I screw into the middle of the cups a headed screw, F, nicked so as to be readily put in or taken out with a screw-driver, and push back the slides D D, so as to open the holes $e$ $e$. The screws F are left extending out with their heads some distance beyond the periphery of cylinder C, so as to carry the cotton-seed down into the spout G, which leads to the discharge-tube H behind the standard I of the furrow-opening plow J.

K K are the covering-plows attached to the standards L.

M is a radially-fingered agitator-shaft for stirring the seed in the hopper and preventing it from clogging. On the outer ends of its journals are placed the cranks $m'$, which are connected by the links N with the cranks $c'$ of the shaft of the dropping-cylinder, so that the latter and the agitator may be simultaneously operated from the ground-wheel.

Having thus described all that is necessary to a full understanding of my invention, what I claim as new, and desire to protect by Letters Patent, is—

A seed-planter having slides D D over opposite holes in the bottom of its hopper and a dropping-cylinder provided with seed-cups on its periphery and removable screws rising from within the cups, whereby it may be changed, as described, so as to plant corn or cotton.

In testimony whereof I affix my signature in presence of two witnesses.

PHILIPP WILLIAM ADOLPH BECKER.

Witnesses:
 H. LANGE,
 F. SCHRÖDER.